Patented Oct. 14, 1930

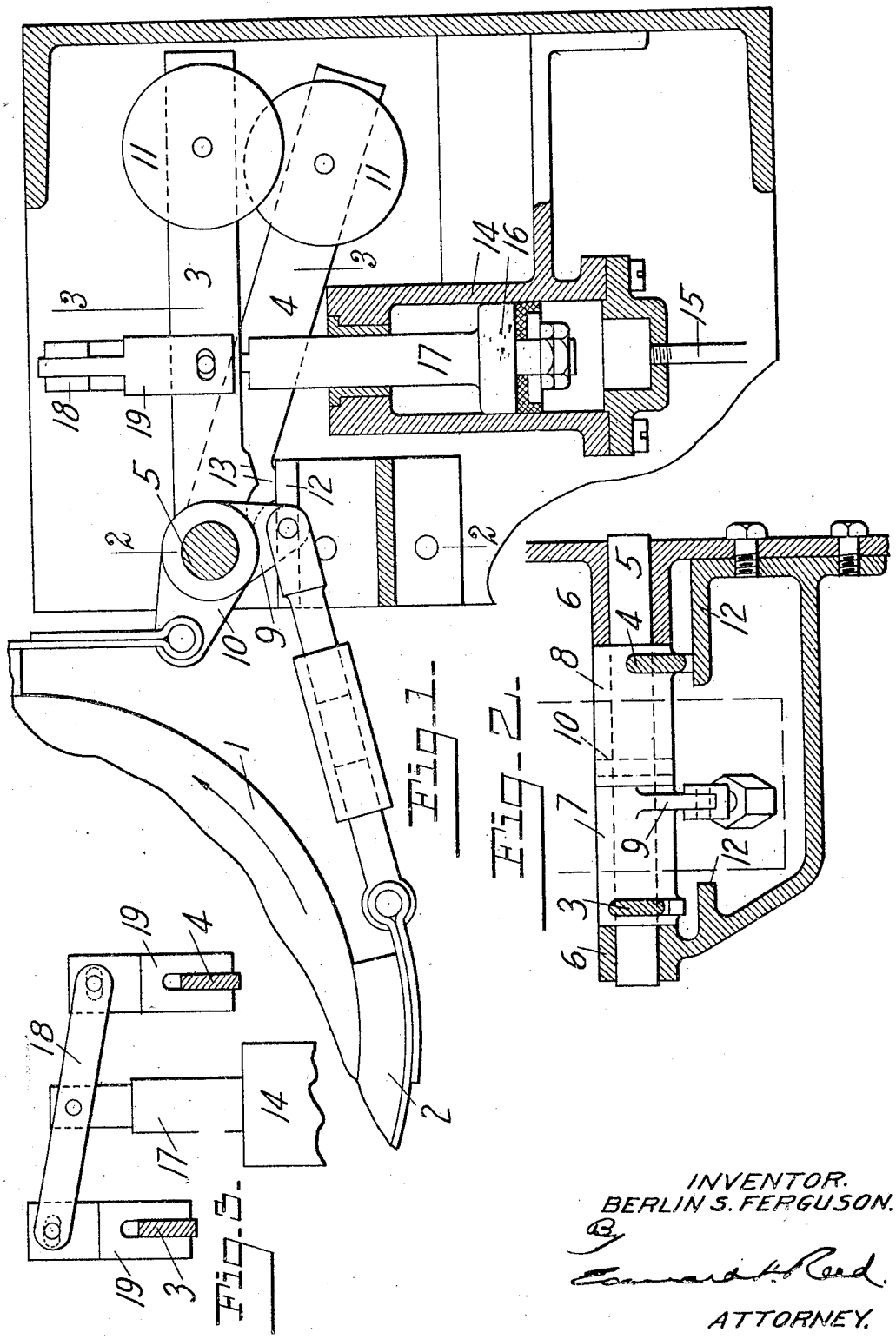

1,778,149

UNITED STATES PATENT OFFICE

BERLIN S. FERGUSON, OF MARION, OHIO, ASSIGNOR TO THE MARION STEAM SHOVEL COMPANY, OF MARION, OHIO, A CORPORATION OF OHIO

BRAKE-OPERATING DEVICE

Application filed April 23, 1927. Serial No. 185,933.

This invention relates to brake operating devices and more particularly to an operating device for band brakes, and is a continuation of the application for patent filed by me September 25, 1925, Serial No. 58,530 in so far as the subject matter thereof is disclosed by the earlier application.

One object of the invention is to provide a band brake mechanism of such a character that it will operate with equal efficiency when the brake drum is rotated in either direction.

A further object of the invention is to provide such a brake mechanism which will retain the band normally in a released or inoperative position and which will operate to anchor one or the other of the ends of the brake band, according to the direction of rotation of the drum, and will act upon the unanchored end of the brake band to tighten the same about the drum.

A further object of the invention is to provide such an actuating mechanism which will be simple in its construction, positive in its operation and inexpensive to produce.

Other objects of the invention will appear as the device is described in detail.

In the accompanying drawings Fig. 1 is a side elevation partly in section, of a brake mechanism embodying my invention; Fig. 2 is a section taken on the line 2—2 of Fig. 1; and Fig. 3 is a section taken on the line 3—3 of Fig. 1.

In these drawings I have illustrated one embodiment of my invention and have shown the same as applied to a brake band of ordinary construction but it will be understood that this embodiment has been chosen for the purpose of illustration only and that the mechanism may take various forms and may be used in connection with brakes of various kinds.

In carrying out my invention I provide means whereby either end of the brake band may be anchored against movement due to the drag of the band on the drum, the end of the band which is so anchored being determined by the direction of rotation of the drum, and for imparting movement to the other end of the brake band in a direction to set the brake. The mechanism is of such a character that it will normally hold the band in its released or inoperative position and preferably separate actuating devices are connected with the respective ends of the band and so arranged that they will normally move the respective ends of the band in a direction to release the same. The rotation of the brake drum will exert a drag on the band which will tend to cause the same to move with the drum and this tendency will exert a pull on that actuating device with which the rear end of the band is connected and means are provided for limiting the movement of either actuating device due to such a pull exerted thereon by the band and thus cause that end of the band to be anchored. The anchored end of the band is usually known as the "dead end." The other actuating device will not be affected by the drag on the band and will normally hold the other or "live" end of the band in an inoperative position. A device under the control of the operator acts on the actuating device which is connected with the live end of the band to move the same in a direction to tighten the band about the drum and thus set the brake. This mechanism may take various forms and may be applied to brakes of various kinds. As here shown, the brake comprises a brake drum 1 and a brake band 2 of the usual construction. The actuating devices which are connected with the respective ends of the band are shown in the form of levers 3 and 4 which are pivotally supported by a shaft 5 which is mounted in bearings 6 carried by the supporting structure or frame of the machine on which the brake is mounted. The levers 3 and 4 are provided respectively with hubs 7 and 8 to which are secured crank arms 9 and 10. The outer ends of the levers 3 and 4 are weighted, as shown at 11, and the crank arms, which are connected with the respective ends of the brake band, are so arranged that the movement of the levers under the influence of their weights will move the respective ends of the band in a direction to release the band. Suitable means are provided to limit the movement of the levers in a downward direction, this means being here shown as comprising stops 12 arranged in the paths of projections 13 on the respective levers. It will be apparent that when the actuating devices or levers are unrestrained they will move downwardly by gravity into contact with the respective stops and will thus move the band into an inoperative position.

The drag of the brake band on the drum will exert a pull on one or the other of the actuating levers and the contact of this lever with its stop will firmly anchor that end of the band which is connected therewith and in order to set the brake means are provided for imparting upward movement to the other actuating lever, thus causing the band to be drawn tightly about the drum and set. This operating or controlling mechanism may take various forms and is here shown as comprising a cylinder 14 connected at one end by a pipe 15 with a source of supply for fluid under pressure. Mounted in this cylinder is a piston 16 having a rod 17 rigidly connected therewith and extending through the upper end of the cylinder. Pivotally mounted on the upper end of the rod 17 is a cross arm 18 connected at its opposite ends with the levers 3 and 4. In the present instance, links 19 are pivotally connected with the respective ends of the cross arm, by a pin and slot connection, and are pivotally connected at their lower ends with the respective levers, also by a pin and slot connection.

When the brake drum is rotated in the direction shown by the arrow in Fig. 1 the drag of the brake band on the drum will hold the lever 4, which is connected with the dead end of the band, firmly against its stop and thus anchor that end, but so long as the other actuating lever, 3, is unrestrained it will hold the band in its released position. When fluid under pressure is admitted to the cylinder the piston will move upwardly and carry with it the cross arm 18 which will impart upward movement to the lever 3, which is connected with the live end of the band, thus drawing the band tightly about the drum and setting the brake. When the brake drum is rotated in the opposite direction that end of the band connected with the lever 3 will be anchored and the lever 4 will be actuated by the controlling device to set the brake.

Ordinarily the operation of a brake band of this character is that above set forth, that is, one end of the band is actuated to exert a pull on the band in the direction in which the drum is rotated, for the purpose of tightening the band about the drum. It is quite possible, however, to operate such a band by exerting a pull thereon in a direction opposite that in which the drum is rotated, that is, by actuating what is normally the dead end of the band. It will be obvious that the present mechanism may be operated in either way.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. The combination with a brake drum which is rotatable in either direction, and a brake band extending about said drum, of separately operable means for anchoring either end of said brake band, according to the direction of rotation of said drum, and for acting on the other end of said band to hold the latter in its released position, and means for imparting movement to the last mentioned end of said brake band in a direction to draw the band about the brake drum.

2. The combination with a brake drum which is rotatable in either direction, and a brake band extending about said drum, of actuating devices connected with the respective ends of said brake band, means for limiting the movement of one or the other of said actuating devices by said band, according to the direction of rotation of said drum, the other of said actuating devices serving normally to hold said band in its released position, and means for imparting movement to the last mentioned actuating device to cause said brake band to be drawn tightly about said drum.

3. The combination with a brake drum which is rotatable in either direction, and a brake band extending about said drum, of levers connected with the respective ends of said brake band and having their ends weighted to cause them to normally move the respective ends of said brake band in directions to release the band, means for limiting the movement of either of said levers by said brake band, and means for moving the other of said levers against the action of its weighted end to cause said brake band to be drawn tightly about said drum.

4. The combination with a brake drum which is rotatable in either direction, and a brake band extending about said drum, of a shaft, a pair of levers each journaled on said shaft and each having one end weighted, crank arms to connect said levers with the respective ends of said brake band, stops to limit the movement of said levers under the influence of their weights and to anchor one end of said brake band, and a controlling device having means for moving that lever which is connected with the other end of said band in a direction to tighten said band about the brake drum.

5. The combination with a brake drum which is rotatable in either direction, and a brake band extending about said drum, of a shaft, a pair of levers each journaled on said shaft and each having one end weighted, crank arms to connect said levers with the respective ends of said brake band, stops to limit the movement of said levers under the influence of their weights and to anchor one end of said brake band, an operating device comprising a pivoted cross arm connected at its ends with the respective levers, and means for imparting transverse movement to said cross arm to cause it to operate that lever which is connected with the other end of said brake band.

6. The combination with a brake drum which is rotatable in either direction, and a brake band extending about said drum, of a shaft, a pair of levers each journaled on said shaft and each having one end weighted, crank arms to connect said levers with the respective ends of said brake band, stops to limit the movement of said levers under the influence of their weights and to anchor one end of said brake band, a cylinder having means for connecting the same with a source of supply for fluid under pressure, a piston mounted in said cylinder, a piston rod connected with said piston, a cross arm pivotally mounted on said piston rod, and means for pivotally connecting the ends of said cross arm with the respective levers.

7. The combination with a brake drum which is rotatable in either direction and a brake band extending about said drum, of separate actuating devices connected with the respective ends of said brake band, one of said actuating devices serving to hold said band normally in its released position, means for imparting movement to one of said actuating devices to cause said band to be tightened about said drum, and means to limit the movement of the other of said actuating devices to anchor that end of said band with which it is connected.

8. The combination with a brake drum which is rotatable in either direction and a brake band extending about said drum, of actuating devices separately movable with relation one to the other and connected with the respective ends of said brake band, means for causing either of said actuating devices to anchor that end of said band with which it is connected, according to the direction of rotation of said drum, the other of said actuating devices acting normally to hold said band in its released position, and an operable device for imparting movement to the last mentioned actuating device to tighten said band about said drum.

In testimony whereof, I affix my signature hereto.

BERLIN S. FERGUSON.